(12) United States Patent
Tashiro et al.

(10) Patent No.: US 9,411,197 B2
(45) Date of Patent: Aug. 9, 2016

(54) LIQUID CRYSTAL DISPLAY PANEL

(71) Applicant: Sharp Kabushiki Kaisha, Osaka-shi, Osaka (JP)

(72) Inventors: Kunihiro Tashiro, Osaka (JP); Hideki Fujimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 153 days.

(21) Appl. No.: 14/377,615

(22) PCT Filed: Feb. 6, 2013

(86) PCT No.: PCT/JP2013/052749
§ 371 (c)(1),
(2) Date: Aug. 8, 2014

(87) PCT Pub. No.: WO2013/118779
PCT Pub. Date: Aug. 15, 2013

(65) Prior Publication Data
US 2015/0002800 A1 Jan. 1, 2015

(30) Foreign Application Priority Data
Feb. 10, 2012 (JP) ................ 2012-027125

(51) Int. Cl.
*G02F 1/1337* (2006.01)
*G02F 1/139* (2006.01)
*G02F 1/1343* (2006.01)

(52) U.S. Cl.
CPC ........ *G02F 1/133753* (2013.01); *G02F 1/1393* (2013.01); *G02F 1/133788* (2013.01);G02F1/134309 (2013.01); *G02F 2001/133742* (2013.01); *G02F 2001/133746* (2013.01); *G02F 2001/133749* (2013.01); *G02F 2001/133761* (2013.01); *G02F 2001/134345* (2013.01)

(58) Field of Classification Search
CPC ........ G02F 2001/133749; G02F 2001/133742; G02F 2001/133757; G02F 2001/133761; G02F 2001/134318; G02F 2001/133565; G02F 2001/133746; G02F 2001/134345; G02F 2001/13373; G02F 2001/133715; G02F 2201/128; G02F 2201/122; G09G 2300/0486; G09G 3/2022; G09G 2320/028; Y10T 428/10; Y10T 428/1005; Y10T 428/1023; C09K 19/02; C09K 19/56; C09K 2019/548

USPC ........... 349/123, 129, 124, 33, 139, 191, 134, 349/136, 93, 121, 127, 130, 144, 172, 92, 349/183, 135; 345/87, 89, 97, 214, 98; 428/1.2, 1.1, 1.26

See application file for complete search history.

(56) References Cited

U.S. PATENT DOCUMENTS

2003/0227429 A1  12/2003  Shimoshikiryo
2005/0030458 A1  2/2005  Sasabayashi et al.
(Continued)

FOREIGN PATENT DOCUMENTS

JP    08-334786 A    12/1996
JP    2000-039615 A   2/2000
(Continued)

OTHER PUBLICATIONS

Official Communication issued in International Patent Application No. PCT/JP2013/052749, mailed on Mar. 12, 2013.

*Primary Examiner* — Thoi Duong
(74) *Attorney, Agent, or Firm* — Keating & Bennett, LLP (57) ABSTRACT

This liquid crystal display panel (100A) includes: first and second substrates (10A, 20A) which are arranged to face each other with a liquid crystal layer (30A) interposed between them; a counter electrode (24) formed on one of the first and second substrates (10A, 20A); a first alignment film (16a) formed on one side of the first substrate (10A) to face the liquid crystal layer (30A); and a second alignment film (26a) formed on one side of the second substrate (20A) to face the liquid crystal layer (30A). In a pixel, the liquid crystal layer (30A) has a low-pretilt region (R1a) and a high-pretilt region (R2a) in which liquid crystal molecules (32) have mutually different pretilt angles. The counter electrode (24) includes a plurality of sub-counter electrodes which are electrically independent of each other. And the plurality of sub-counter electrodes include a first sub-counter electrode (24ab) associated with the low-pretilt region (R1a) and a second sub-counter electrode (24b) associated with the high-pretilt region (R2a).

9 Claims, 7 Drawing Sheets

(56) References Cited

U.S. PATENT DOCUMENTS

| | | |
|---|---|---|
| 2009/0325453 A1 | 12/2009 | Lee et al. |
| 2011/0157531 A1 | 6/2011 | Suwa et al. |
| 2011/0193769 A1 | 8/2011 | Ohgami et al. |
| 2011/0273652 A1 | 11/2011 | Suwa et al. |

FOREIGN PATENT DOCUMENTS

| | | |
|---|---|---|
| JP | 2004-062146 A | 2/2004 |
| JP | 2004-279904 A | 10/2004 |
| JP | 2011-017786 A | 1/2011 |
| WO | 2010/041418 A1 | 4/2010 |
| WO | 2010/087280 A | 8/2010 |
| WO | 2010/087281 A1 | 8/2010 |

LIQUID CRYSTAL DISPLAY PANEL

TECHNICAL FIELD

The present invention relates to a liquid crystal display panel.

BACKGROUND ART

Recently, people have proposed various measures for reducing the viewing angle dependence of the γ characteristic of a liquid crystal display panel. The "γ characteristic" is a grayscale luminance characteristic. If the γ characteristic has viewing angle dependence, the γ characteristic when the panel is viewed straight on and the γ characteristic when the panel is viewed obliquely will be different from each other, and therefore, the grayscale display state will also vary according to the viewing direction (i.e., the viewing angle).

To overcome this problem, according to a known method (see Patent Document No. 1, for example), each pixel is divided into multiple subpixels and mutually different effective voltages are applied to respective liquid crystal layers of those multiple subpixels. Such a method of dividing a single pixel into multiple subpixels is generally called a "pixel division" and various circuit structures have been developed for that purpose.

Meanwhile, Patent Document No. 2 discloses a liquid crystal display panel in which multiple regions with mutually different pretilt angles are defined in the liquid crystal layer of a pixel by using the polymer sustained alignment technology (which will be referred to herein as a "PSA technology"). According to the PSA technology, a small amount of a polymerizable material (such as a photo-polymerizable monomer) is introduced into a liquid crystal material, and the polymerizable material is irradiated with an active energy ray (which is typically an ultraviolet ray and is supposed to be an ultraviolet ray in the following description) with a predetermined voltage applied to the liquid crystal layer after the liquid crystal cell has been assembled, thereby controlling the pretilt azimuth and pretilt angle of liquid crystal molecules with the polymer thus produced. In the following description, to control the pretilt azimuth and pretilt angle of liquid crystal molecules will be sometimes referred to herein as "giving a pretilt to the liquid crystal molecules". The alignment state of the liquid crystal molecules when the polymer is produced is sustained (i.e., memorized) even after the voltage is removed (i.e., no longer applied). In this description, the pretilt azimuth is defined by the azimuth angle within a substrate plane (e.g., when the display screen is compared to a clock face, the three o'clock direction may have an azimuth angle of zero degrees and the angle may increase counterclockwise) and the pretilt angle is defined to be the angle formed with respect to the substrate plane (which corresponds to the angle of elevation, and the pretilt angle along a normal to the substrate plane is 90 degrees). The pretilt angle in each region of the liquid crystal layer becomes the average of the pretilt angles of liquid crystal molecules which are located close to the surface of an alignment film in that region and the pretilt angles of liquid crystal molecules which are located everywhere else. In the following description, the pretilt angle to be given to those liquid crystal molecules which are located close to the surface of an alignment film will be sometimes referred to herein as the pretilt angle of that alignment film (or alignment region).

As methods for forming multiple regions with mutually different pretilt angles in each pixel, Patent Document No. 2 discloses the following two methods (1) and (2):

(1) By introducing a structure for applying mutually different voltages to the liquid crystal layer of multiple regions in a pixel, the polymerizable material included in the liquid crystal layer may be polymerized with mutually different voltages applied to those multiple regions in each pixel, thereby making the pretilt angles different from one region to another. In this case, every region of a single pixel is irradiated at the same time with an ultraviolet ray for the purpose of polymerization.

(2) Or the process step of irradiating only a particular region of a single pixel which has been selected through a photomask with an ultraviolet ray and producing a polymer in only that particular region of the pixel may be performed a number of times. In this case, when the regions to irradiate an ultraviolet ray with are changed, the voltages applied to the liquid crystal layer are also changed. According to this method (2), such a structure for applying mutually different voltages to the liquid crystal layer of multiple regions in a pixel is not needed.

Recently, as methods for giving a pretilt to liquid crystal molecules (i.e., as methods for controlling the pretilt azimuth and pretilt angle), not only the PSA technology but also methods disclosed in Patent Documents Nos. 3 to 5 are known as well. According to the methods disclosed in Patent Documents No. 3 to 5, no polymerizable material is added to the liquid crystal material and no unreacted polymerizable material will be left in the liquid crystal layer of the liquid crystal display panel, unlike a situation where the PSA technology is adopted.

Patent Documents Nos. 3 to 5 disclose a method for giving a pretilt to liquid crystal molecules using an alignment film material including a polymer material with a cross-linkable site (i.e., a cross-linkable group). Specifically, with a voltage applied to a liquid crystal layer that is interposed between two substrates, each of which is coated with such an alignment film material including a polymer material with a cross-linkable site, the alignment film material is irradiated with an ultraviolet ray, thereby causing the cross-linkable site to cross-link and forming an alignment film with a cross-linking structure. This alignment film with such a cross-linking structure functions to fix the alignment state of liquid crystal molecules which are located close to the alignment film material when the material is irradiated with the ultraviolet ray. That is why even after the voltage that has been applied to the liquid crystal layer is removed, the liquid crystal molecules that are located close to the alignment film will sustain the alignment state that has been regulated by the electric field. In this manner, the alignment film gives a pretilt to the liquid crystal molecules.

Patent Document No. 6 discloses a liquid crystal display device which divides a counter electrode that faces pixel electrodes into multiple sub-counter electrodes and which applies mutually different effective voltages to respective liquid crystal layers of multiple pixels, thereby minimizing a decrease in the aperture ratio of the display area and suppressing the whitening phenomenon efficiently. The entire disclosure of Patent Document No. 6 is hereby incorporated by reference.

CITATION LIST

Patent Literature

Patent Document No. 1: Japanese Laid-Open Patent Publication No. 2004-62146
Patent Document No. 2: Japanese Laid-Open Patent Publication No. 2004-279904

Patent Document No. 3: United States Patent Application Publication No. 2009/0325453
Patent Document No. 4: WO 2010/087280
Patent Document No. 5: WO 2010/087281
Patent Document No. 6: WO 2010/041418

SUMMARY OF INVENTION

Technical Problem

If the pixel division technique disclosed in Patent Document No. 1 and other documents is adopted, a single pixel electrode is divided into multiple subpixel electrodes. That is why the larger the number of division, the lower the aperture ratio of the pixel will be, which is a problem. A similar problem will arise even when the method (1) disclosed in Patent Document No. 2 is adopted.

On the other hand, according to the method (2) disclosed in Patent Document No. 2, the process step of selectively irradiating only a particular region of a pixel with light through a photomask needs to be performed at least twice while the device is still in the form of a liquid crystal cell. Since the device still in the form of a liquid crystal cell is irradiated with light, the accuracy achieved cannot be as high as what is achieved by a so-called "contact exposure method" or "proximity exposure method". In addition, the accuracy will further decrease due to scattering and diffusion of light to be caused by the liquid crystal cell's lines and other structures. And this problem arises every time the cell is irradiated with light.

Furthermore, if the liquid crystal display device disclosed in Patent Document No. 6 is adopted, the decrease in aperture ratio can be certainly minimized. However, if the counter voltage is changed to cope with γ shift, sometimes the transmittance may decrease accordingly.

A primary object of the present invention is to provide a liquid crystal display panel which can increase the pixel's transmittance and which has a wide viewing angle.

Solution to Problem

A liquid crystal display panel according to an embodiment of the present invention includes: a liquid crystal layer including liquid crystal molecules; first and second substrates which are arranged to face each other with the liquid crystal layer interposed between themselves; a counter electrode formed on one of the first and second substrates; a first alignment film formed on one side of the first substrate so as to face the liquid crystal layer; a second alignment film formed on one side of the second substrate so as to face the liquid crystal layer; and a pixel. In the pixel, the liquid crystal layer has a low-pretilt region and a high-pretilt region in which the liquid crystal molecules have mutually different pretilt angles. The counter electrode includes a plurality of sub-counter electrodes which are electrically independent of each other. And the plurality of sub-counter electrodes include a first sub-counter electrode associated with the low-pretilt region and a second sub-counter electrode associated with the high-pretilt region.

In one embodiment, the first alignment film has a first low-pretilt alignment region which contacts with the low-pretilt region and a first high-pretilt alignment region which contacts with the high-pretilt region. The second alignment film has a second low-pretilt alignment region which contacts with the low-pretilt region and a second high-pretilt alignment region which contacts with the high-pretilt region.

In one embodiment, the liquid crystal display panel further includes: a first alignment sustaining layer arranged closer to the liquid crystal layer than the first alignment film is; and a second alignment sustaining layer arranged closer to the liquid crystal layer than the second alignment film is. Each of the first and second alignment sustaining layers is made of a photo-polymerized compound. The first alignment sustaining layer has a first low-pretilt alignment region which contacts with the low-pretilt region and a first high-pretilt alignment region which contacts with the high-pretilt region. The second alignment sustaining layer has a second low-pretilt alignment region which contacts with the low-pretilt region and a second high-pretilt alignment region which contacts with the high-pretilt region. And the liquid crystal molecules have their pretilt angle defined by the first and second alignment sustaining layers.

In one embodiment, at least one of the first and second alignment films has a cross-linking structure, dimer or isomer formed through a photo-reaction.

In one embodiment, the first and second low-pretilt alignment regions give a pretilt angle of 84.0 degrees to less than 88.0 degrees to the liquid crystal molecules in the low-pretilt region. And the first and second high-pretilt alignment regions give a pretilt angle of 88.0 degrees to less than 90.0 degrees to the liquid crystal molecules in the high-pretilt region.

In one embodiment, the difference in pretilt angle between the high-pretilt region and the low-pretilt region is 1.0 to 3.0 degrees.

In one embodiment, in the pixel, the area of the high-pretilt region is larger than the area of the low-pretilt region.

In one embodiment, in the pixel, the area of the high-pretilt region is approximately twice as large as the area of the low-pretilt region.

In one embodiment, the liquid crystal display panel has a gap between the first and second sub-counter electrodes, and the gap overlaps with either a non-transparent metal layer or a boundary region between the low-pretilt region and high-pretilt region of the liquid crystal layer.

Advantageous Effects of Invention

An embodiment of the present invention provides a liquid crystal display panel which can increase the pixel's transmittance and which has a wide viewing angle.

BRIEF DESCRIPTION OF DRAWINGS

FIGS. 1 (*a*) and (*b*) are schematic cross-sectional views illustrating liquid crystal display panels 100A and 100B according to an embodiment of the present invention.

FIG. 2A (*a*) is a schematic plan view illustrating the pixel electrode 14 of one pixel that the liquid crystal display panels 100A and 100B each have, and (*b*) is a schematic plan view illustrating the counter electrode 24 of the one pixel that the liquid crystal display panels 100A and 100B each have.

FIG. 2B (*a*) is a schematic plan view illustrating the pixel electrode 14 of another pixel, and (*b*) is a schematic plan view illustrating the counter electrode 24 of that another pixel.

FIGS. 3 (*a*) and (*b*) are graphs showing the respective (front) V-T (voltage-transmittance) characteristics of liquid crystal display panels.

FIGS. 4 (*a*) and (*b*) are graphs showing the respective (front and oblique) γ characteristics of various liquid crystal display panels.

DESCRIPTION OF EMBODIMENTS

Hereinafter, a liquid crystal display panel and method for fabricating the panel according to an embodiment of the present invention will be described with reference to the accompanying drawings. In the following description, a vertical alignment liquid crystal display panel operating in normally black mode using liquid crystal molecules with negative dielectric anisotropy will be described as an example. However, this is just an example and the present invention has various other embodiments.

Figure 1:
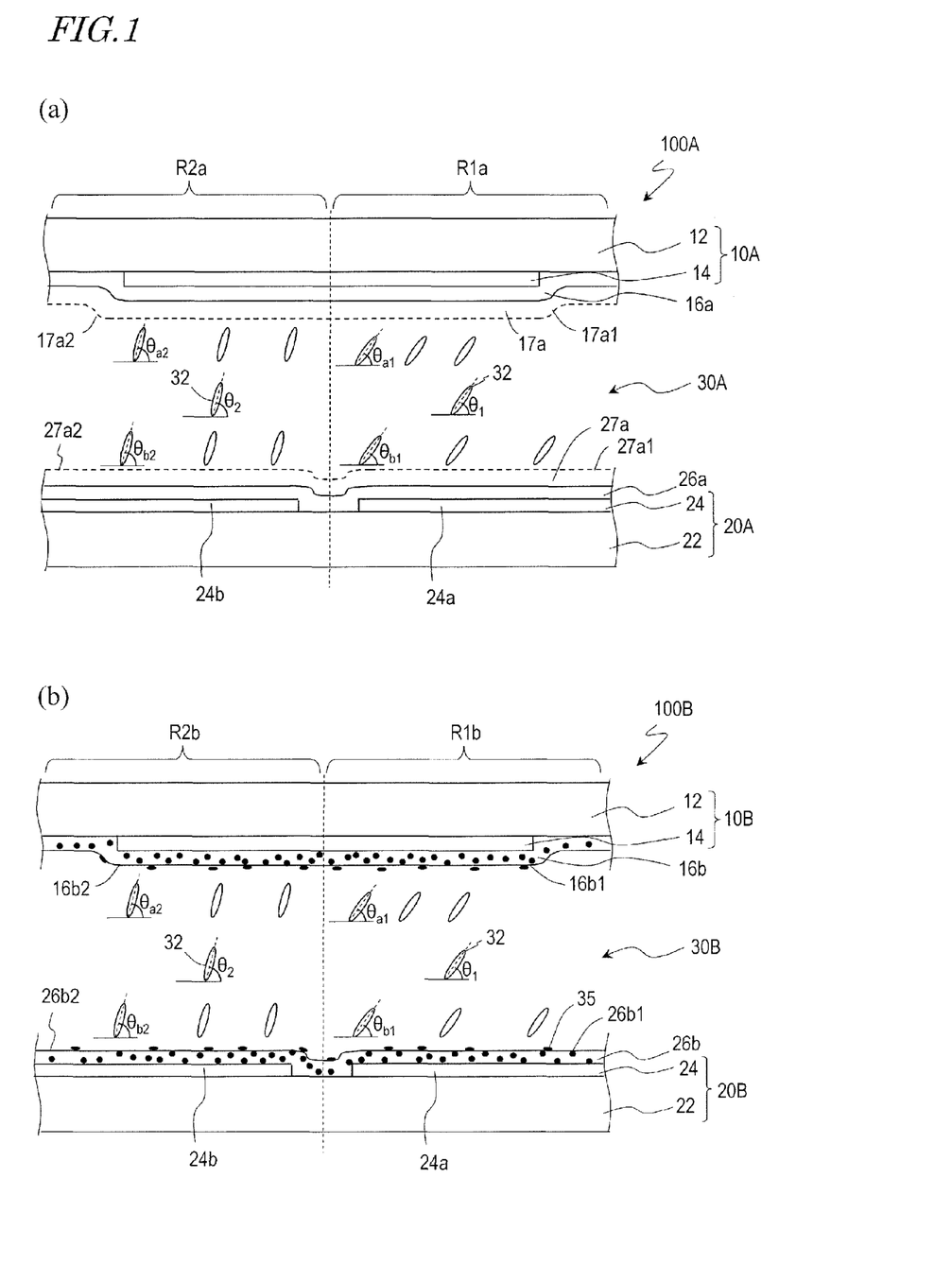

FIGS. 1(a) and 1(b) are schematic cross-sectional views illustrating liquid crystal display panels 100A and 100B according to an embodiment of the present invention. Specifically, FIG. 1(a) illustrates a schematic cross-sectional structure showing a low-pretilt region R1a and a high-pretilt region R2a which are located in a single pixel of the liquid crystal display panel 100A. On the other hand, FIG. 1(b) illustrates a schematic cross-sectional structure showing a low-pretilt region R1b and a high-pretilt region R2b which are located in a single pixel of the liquid crystal display panel 100B. In FIG. 1 and other drawings to be referred to in the following description, illustration of phase plates and polarizers which are arranged outside of the substrates is omitted.

Figure 2A:
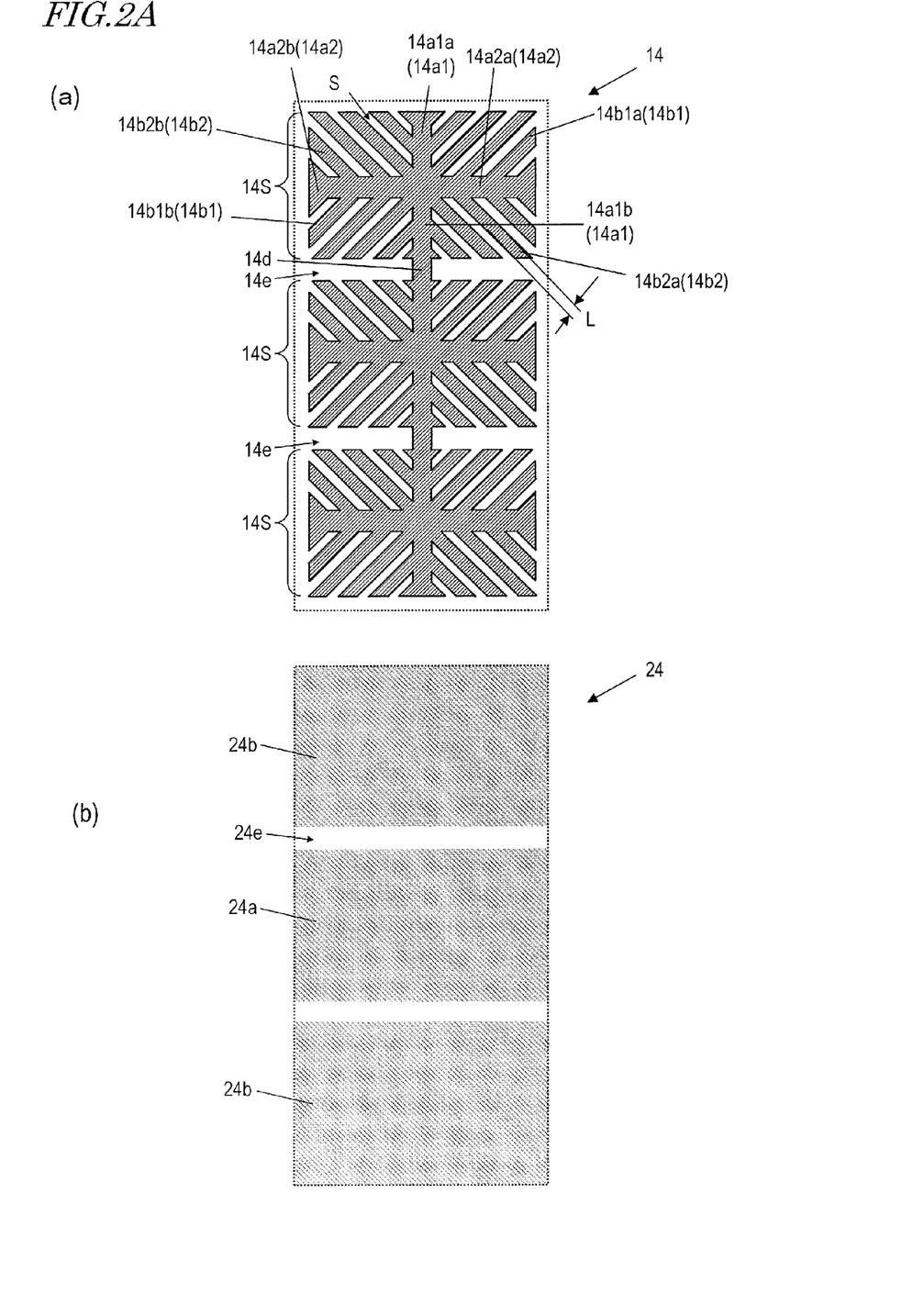
Figure 2B:
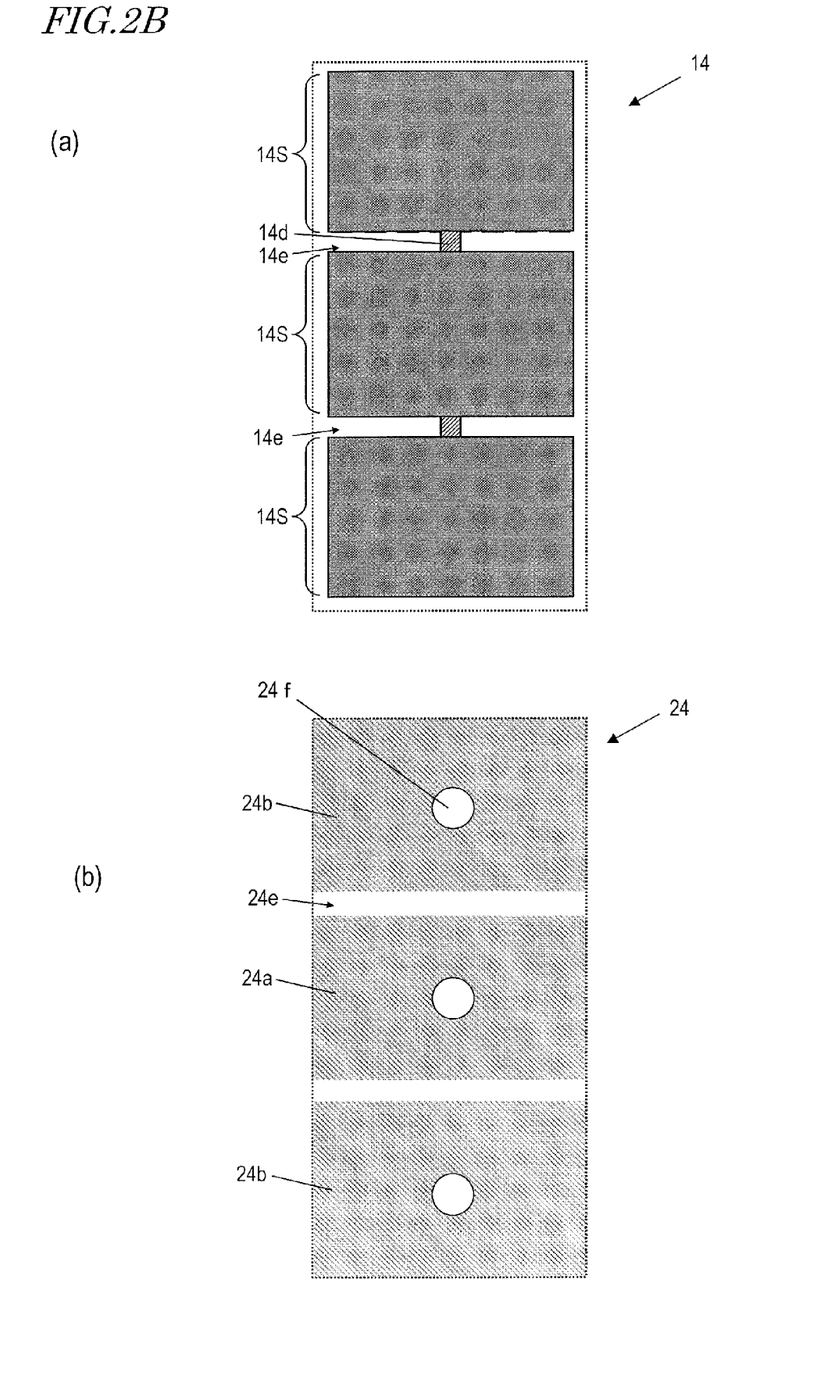

FIG. 2A(a) is a schematic plan view illustrating the pixel electrode 14 of one pixel that the liquid crystal display panels 100A and 100B each have. FIG. 2A(b) is a schematic plan view illustrating the counter electrode 24 of the one pixel that the liquid crystal display panels 100A and 100B each have. FIG. 2B(a) is a schematic plan view illustrating the pixel electrode 14 of another pixel, and FIG. 2B(b) is a schematic plan view illustrating the counter electrode 24 of that another pixel.

The liquid crystal display panel 100A shown in FIG. 1(a) includes a liquid crystal layer 30A with liquid crystal molecules 32, first and second substrates 10A and 20A (which may be a TFT substrate and a color filter substrate, respectively, and) which are arranged to face each other with the liquid crystal layer 30A interposed between them, a first alignment film 16a arranged on one side of the first substrate 10A so as to face the liquid crystal layer 30A, and a second alignment film 26a arranged on one side of the second substrate 20A so as to face the liquid crystal layer 30A. The second substrate 20A is typically arranged closer to the viewer.

In this embodiment, the first and second alignment films 16a and 26a are vertical alignment films. The liquid crystal display panel 100A further includes a first alignment sustaining layer 17a arranged closer to the liquid crystal layer 30A than the first alignment film 16a is and a second alignment sustaining layer 27a arranged closer to the liquid crystal layer 30A than the second alignment film 26a is. The first and second alignment sustaining layers 17a and 27a are each made of a polymerized compound which has been produced through a photo reaction. Although a specific method of forming the first and second alignment sustaining layers 17a and 27a according to this embodiment will be described later, the methods disclosed in Patent Documents Nos. 4 and 5 may be adopted, for example. The entire disclosures of Patent Documents Nos. 4 and 5 are hereby incorporated by reference.

The first substrate 10A (which is a TFT substrate in this example) includes a transparent substrate 12 (which may be a glass substrate), pixel electrodes 14, and TFTs and various lines (including gate bus lines, source bus lines, and storage capacitor (CS) bus lines) which are not shown in FIG. 1(a). The first alignment film 16a has been formed so as to cover the pixel electrodes 14 and to contact with the liquid crystal layer 30A. The second substrate 20A (which is a color filter substrate in this example) includes a transparent substrate 22 (which may be a glass substrate), a counter electrode 24, and a color filter layer (including RGB color filters, for example) and a black matrix layer which are not shown in FIG. 1(a). The counter electrode 24 is comprised of a plurality of sub-counter electrodes (including sub-counter electrodes 24a and 24b) which are electrically independent of each other.

In each pixel of the liquid crystal display panel 100A, the liquid crystal layer 30A has a low-pretilt region R1a (in which the liquid crystal molecules 32 have a pretilt angle $\Theta_1$) and a high-pretilt region R2a (in which the liquid crystal molecules 32 have a pretilt angle $\Theta_2$) where the liquid crystal molecules 32 have mutually different pretilt angles. In FIG. 1(a), the liquid crystal molecules 32 of the liquid crystal layer 30A are illustrated around the middle of the thickness just for convenience sake. However, the pretilt angle $\Theta_1$, $\Theta_2$ shown in FIG. 1(a) does not indicate the pretilt angle of the liquid crystal molecules at that particular site but does indicate the representative pretilt angle in each region, i.e., the average of the pretilt angle of liquid crystal molecules which are located close to the surface of the alignment film and that of liquid crystal molecules which are located everywhere else. The sub-counter electrode 24a has been formed in association with the low-pretilt region R1a and the sub-counter electrode 24b has been formed in association with the high-pretilt region R2a. As will be described in detail later, if the sub-counter electrodes 24a and 24b which are electrically independent of each other are formed so as to be associated with the low-pretilt region R1a and the high-pretilt region R2a, respectively, mutually different voltages can be applied when the low-pretilt region R1a and the high-pretilt region R2a are formed.

The first alignment sustaining layer 17a has a first low-pretilt alignment region 17a1 (which has a pretilt angle $\Theta_{a1}$ and) which contacts with the low-pretilt region R1a and a first high-pretilt alignment region 17a2 (which has a pretilt angle $\Theta_{a2}$ and) which contacts with the high-pretilt region R2a. The second alignment sustaining layer 27a has a second low-pretilt alignment region 27a1 (which has a pretilt angle $\Theta_{b1}$ and) which contacts with the low-pretilt region R1a and a second high-pretilt alignment region 27a2 (which has a pretilt angle $\Theta_{b2}$ and) which contacts with the high-pretilt region R2a. The pretilt angles $\Theta_{a2}$ and $\Theta_{b2}$ of the first and second high-pretilt alignment regions 17a2 and 27a2 are less than 90.0 degrees. The pretilt angles ($\Theta_{a1}$, $\Theta_{b1}$) of the low-pretilt alignment regions are smaller than the pretilt angles ($\Theta_{a2}$, $\Theta_{b2}$) of the high-pretilt alignment regions.

The pretilt angle $\Theta_1$ of the liquid crystal molecules 32 in the low-pretilt region R1a is determined by the pretilt angle $\Theta_{a1}$ in the first low-pretilt alignment region 17a1 of the first alignment sustaining layer 17a and the pretilt angle $\Theta_{b1}$ in the second low-pretilt alignment region 27a1 of the second alignment sustaining layer 27a, and $\Theta_1$ satisfies $\Theta_2 \geq \Theta_{a1}$ and $\Theta_1 \geq \Theta_{b1}$. In the same way, the pretilt angle $\Theta_2$ of the liquid crystal molecules 32 in the high-pretilt region R2a is determined by the pretilt angle $\Theta_{a2}$ in the first high-pretilt alignment region 17a2 of the first alignment sustaining layer 17a and the pretilt angle $\Theta_{b2}$ in the second high-pretilt alignment region 27a2 of the second alignment sustaining layer 27a, and $\Theta_2$ satisfies $\Theta_2 \geq \Theta_{a2}$ and $\Theta_2 \geq \Theta_{b2}$. In this example, $\Theta_{a1} < \Theta_{a2}$ and $\Theta_{b1} < \Theta_{b2}$ are satisfied, and therefore, $\Theta_1 < \Theta_2$ is realized. It should be noted that $\Theta_{a1}$ and $\Theta_{b1}$ may be equal to each other or different from each other. Likewise, $\Theta_{a2}$ and $\Theta_{b2}$ may also be equal to each other or different from each other.

As will be described later by way of specific examples, the first and second low-pretilt alignment regions 17a1 and 27a1 suitably give a pretilt angle $\Theta_1$ of 84.0 degrees to less than 88.0 degrees to the liquid crystal molecules 32 in the low-pretilt region R1a, and the first and second high-pretilt alignment regions 17a2 and 27a2 suitably give a pretilt angle $\Theta_2$ of 88.0 degrees to less than 90.0 degrees to the liquid crystal molecules 32 in the high-pretilt region R2a. In a normally black mode vertical alignment liquid crystal display panel, if the pretilt angle $\Theta_1$ in the low-pretilt region R1a were less than 84.0 degrees, the black luminance would increase so much that the contrast ratio would decrease. Also, if the pretilt angle $\Theta_2$ in the high-pretilt region R2a reached 90.0 degrees, the pretilt of the liquid crystal molecules 32 would lose stability and have their alignment disturbed, thus resulting in lower response speed (from black to white). Furthermore, to improve the γ characteristic effectively, the difference between the pretilt angle $\Theta_1$ in the low-pretilt region R1a of the liquid crystal layer 30A and the pretilt angle $\Theta_2$ in the high-pretilt region R2a within a pixel is suitably equal to or greater than 1.0 degree. The pretilt angles $\Theta_1$ and $\Theta_2$ of the low-pretilt region R1a and the high-pretilt region R2a are suitably set so as to satisfy these conditions.

The liquid crystal display panel 100B shown in FIG. 1(b) includes a liquid crystal layer 30B with liquid crystal molecules 32, first and second substrates 10B and 20B (which may be a TFT substrate and a color filter substrate, respectively, and) which are arranged to face each other with the liquid crystal layer 30B interposed between them, a first alignment film 16b arranged on one side of the first substrate 10B so as to face the liquid crystal layer 30B, and a second alignment film 26b arranged on one side of the second substrate 20B so as to face the liquid crystal layer 30B. In this liquid crystal display panel 100B, no first alignment sustaining layer is arranged closer to the liquid crystal layer 30B than the first alignment film 16b on the first substrate 10B is and no second alignment sustaining layer is arranged closer to the liquid crystal layer 30B than the second alignment film 26b on the second substrate 20B is, which is a major difference from the liquid crystal display panel 100A. In addition, the first and second alignment films 16b and 26b of this liquid crystal display panel 100B each have a cross-linking structure, dimer or isomer 35 formed through a photo-reaction. It should be noted that at least one of the first and second alignment films 16b and 26b needs to have a cross-linking structure, dimer or isomer 35 formed through a photo-reaction. Any component also included in the liquid crystal display panel 100A and having substantially the same structure and function as its counterpart is identified by the same reference numeral and description thereof will be omitted herein.

In each pixel of the liquid crystal display panel 100B, the liquid crystal layer 30B has a low-pretilt region R1b (in which the liquid crystal molecules 32 have a pretilt angle $\Theta_1$) and a high-pretilt region R2b (in which the liquid crystal molecules 32 have a pretilt angle $\Theta_2$) where the liquid crystal molecules 32 have mutually different pretilt angles. The first alignment film 16b has a first low-pretilt alignment region 16b1 (which has a pretilt angle $\Theta_{a1}$ and) which contacts with the low-pretilt region R1b and a first high-pretilt alignment region 16b2 (which has a pretilt angle $\Theta_{a2}$ and) which contacts with the high-pretilt region R2b. Just like the first alignment film 16b, the second alignment film 26b also has a second low-pretilt alignment region 26b1 (which has a pretilt angle $\Theta_{b1}$ and) which contacts with the low-pretilt region R1b and a second high-pretilt alignment region 26b2 (which has a pretilt angle $\Theta_{b2}$ and) which contacts with the high-pretilt region R2b.

The pretilt angle $\Theta_1$ of the liquid crystal molecules 32 in the low-pretilt region R1b is determined by the pretilt angle $\Theta_{a1}$ in the first low-pretilt alignment region 16b1 of the first alignment film 16b and the pretilt angle $\Theta_{b1}$ in the second low-pretilt alignment region 26b1 of the second alignment film 26b, and $\Theta_1$ satisfies $\Theta_1 \geq \Theta_{a1}$ and $\Theta_1 \leq \Theta_{b1}$. In the same way, the pretilt angle $\Theta_2$ of the liquid crystal molecules 32 in the high-pretilt region R2b is determined by the pretilt angle $\Theta_{a2}$ in the first high-pretilt alignment region 16b2 of the first alignment film 16b and the pretilt angle $\Theta_{b2}$ in the second high-pretilt alignment region 26b2 of the second alignment film 26b, and $\Theta_2$ satisfies $\Theta_2 \geq \Theta_{a2}$ and $\Theta_2 \geq \Theta_{b2}$. In this example, $\Theta_{a1} < \Theta_{a2}$ and $\Theta_{b1} < \Theta_{b2}$ are satisfied, and therefore, $\Theta_1 < \Theta_2$ is realized. It should be noted that $\Theta_{a1}$ and $\Theta_{b1}$ may be equal to each other or different from each other. Likewise, $\Theta_{a2}$ and $\Theta_{b2}$ may also be equal to each other or different from each other.

The first and second low-pretilt alignment regions 16b1 and 26b1 suitably give a pretilt angle $\Theta_1$ of 84.0 degrees to less than 88.0 degrees to the liquid crystal molecules 32 in the low-pretilt region R1b, and the first and second high-pretilt alignment regions 16b2 and 26b2 suitably give a pretilt angle $\Theta_2$ of 88.0 degrees to less than 90.0 degrees to the liquid crystal molecules 32 in the high-pretilt region R2b.

In the liquid crystal display panels 100A and 100B of this embodiment, the liquid crystal molecules 32 in the low-pretilt region R1a or R1b may have a pretilt angle of 87.0 degrees (i.e., $\Theta_{a1} = \Theta_{b1} = 87.0$ degrees), the liquid crystal molecules 32 in the high-pretilt region R2a or R2b may have a pretilt angle of 89.5 degrees (i.e., $\Theta_{a2} = \Theta_{b2} = 89.5$ degrees), and their difference may be 2.5 degrees, for example.

As shown in FIGS. 2A(a) and 2A(b), each of the liquid crystal display panels 100A and 100B has three subpixel electrodes and three sub-counter electrodes within a single pixel. The pixel electrode 14 shown in FIG. 2A(a) includes three subpixel electrodes 14S within a single pixel. The counter electrode 24 shown in FIG. 2A(b) includes a sub-counter electrode 24a and two sub-counter electrodes 24b within a single pixel. In the liquid crystal display panels 100A and 100B, each pixel electrode may have the following dimensions:

Size of the pixel electrode: 66 µm×198 µm,
Electrode line width L of its branch portions: 3 µm,
Slit width S: 3 µm,
Size of the subpixel electrodes 14S: 66 µm×62 µm,
Gap 14e between the subpixel electrodes: 6 µm, and
Gap 24e between the sub-counter electrodes: 6 µm For example, one low-pretilt region R1a or R1b and two high-pretilt regions R2a or R2b may be defined within a single pixel. The sub-counter electrode 24a is arranged so as to face the low-pretilt region R1a or R1b, and the two sub-counter electrodes 24b are arranged so as to face the two high-pretilt regions R2a or R2b. Also, when viewed along a normal to the liquid crystal display panel 100A or 100B, the low-pretilt region R1a or R1b is arranged between the two high-pretilt regions R2a or R2b.

Hereinafter, the subpixel electrodes will be described with reference to FIG. 2A(a), in which when the display screen is compared to a clock face, the three o'clock direction is supposed to have an azimuth angle of zero degrees and the angle is supposed to increase counterclockwise.

The three subpixel electrodes 14S shown in FIG. 2A(a) are arranged so as to face the sub-counter electrodes 24a, 24b and are electrically connected together. Also, each of these three subpixel electrodes 14S may define four liquid crystal domains with mutually different alignment azimuths.

Each of these subpixel electrodes 14S includes a trunk portion 14a2 which runs in the azimuth angle 0 degree-180 degree direction, another trunk portion 14a1 which runs in the azimuth angle 90 degree-270 degree direction, a plurality of branch portions 14b1 (which will be referred to herein as "first branch portions" and) which runs in the azimuth angle 45 degree-225 degree direction (which will be referred to herein as a "first direction") and a plurality of branch portions 14b2 (which will be referred to herein as "second branch portions" and) which runs in the azimuth angle 135 degree-315 degree direction (which will be referred to herein as a "second direction").

The trunk portion 14a2 includes a trunk portion 14a2a which runs in the azimuth angle 0 degree direction from the intersection between the trunk portions 14a2 and 14a1 around the center of the subpixel electrode 14S and another trunk portion 14a2b which runs in the azimuth angle 180 degree direction from that intersection. The trunk portion 14a1 includes a trunk portion 14a1a which runs in the azimuth angle 90 degree direction from that intersection and another trunk portion 14a1b which runs in the azimuth angle 270 degree direction from that intersection.

The branch portions 14b1 include a plurality of branch portions 14b1a which runs in the azimuth angle 45 degree direction from the trunk portion 14a1a or 14a2a and a plurality of branch portions 14b1b which runs in the azimuth angle 225 degree direction from the trunk portion 14a1b or 14a2b. The branch portions 14b2 include a plurality of branch portions 14b2b which runs in the azimuth angle 135 degree direction from the trunk portion 14a1a or 14a2b and a plurality of branch portions 14b2a which runs in the azimuth angle 315 degree direction from the trunk portion 14a2a or 14a1b.

The respective sub-counter electrodes 24a and 24b are electrically independent of each other and are arranged with gaps 24e left between them. The two sub-counter electrodes 24b are arranged in association with the high-pretilt regions and the sub-counter electrode 24a located between the two sub-counter electrodes 24b is arranged in association with the low-pretilt region. The gaps 24e suitably overlap with a non-transparent metal layer (such as a gate bus line, a source bus line or a storage capacitor line) or the boundary region between the low-pretilt region R1a and the high-pretilt region R2a of the liquid crystal layer 30A, 30B. If such gaps 24e are left, then the effect of checking a decrease in aperture ratio can be achieved.

If a voltage is applied to between the pixel electrode 14 and the counter electrode 24 that are arranged to face each other with the liquid crystal layer interposed between them, an electric field generated in the liquid crystal layer produces four kinds of liquid crystal domains, in which the directors point mutually different azimuths. In this case, the azimuth pointed by the directors in each liquid crystal domain is parallel to any of the branch portions 14b1a, 14b1b, 14b2a and 14b2b. If the TFT substrate is arranged to face down and the counter substrate is arranged to face the viewer, the directors in the domain produced by the branch portions 14b1a point the azimuth angle 225 degree direction. Likewise, the directors in the domain produced by the branch portions 14b2b point the azimuth angle 315 degree direction. The directors in the domain produced by the branch portions 14b1b point the azimuth angle 45 degree direction. And the directors in the domain produced by the branch portions 14b2a point the azimuth angle 135 degree direction. Of two polarizers which are arranged as crossed Nicols, one polarizer has its polarization axis (i.e., transmission axis) defined in the horizontal direction (i.e., 0 degree-180 degree direction) and the other polarizer has its polarization axis defined in the vertical direction (i.e., 90 degree-270 degree direction). And the directors in the four kinds of liquid crystal domains point azimuths which are bisectors between the two orthogonal polarization axes. As a result, a wide viewing angle is realized.

In each subpixel electrode 14S, the branch portions 14b1 and 14b2 have the same width L and the interval between two arbitrary adjacent branch portions 14b1 (which will be referred to herein as a "slit width S") is the same as the interval between two arbitrary adjacent branch portions 14b2 (which will also be referred to herein as a "slit width S"). The branch portions 14b1 and 14b2 suitably have an electrode line width L of 1 µm to 5 µm and a slit width S of 1 µm to 5 µm, too.

Two adjacent subpixel electrodes 14S are electrically connected together with a linking portion 14d extended from the trunk portion 14a1. Between those subpixel electrodes 14S, there is only a gap 14e but the linking portion 14d.

Furthermore, as also can be seen from the sub-counter electrodes 24a and 24b shown in FIG. 2A(b), the combined area of the high-pretilt regions R2a or R2b suitably accounts for a larger percentage of a single pixel than the area of the low-pretilt region R1a or R1b does. For example, the combined area of the high-pretilt regions R2a or R2b is suitably twice as large as the area of the low-pretilt region R1a or R1b. If such a relation is satisfied, the effect of further reducing the viewing angle dependence of the γ characteristic can be achieved.

In this example, an electrode pattern with a fishbone structure comprised of the trunk portions 14a1 and 14a2 and a plurality of branch portions 14b1 and 14b2 as shown in FIG. 2A(a) is used as an exemplary pixel electrode structure. However, as long as a pixel electrode can be divided into multiple subpixel electrodes, the fishbone structure does not always have to be used. Alternatively, the pixel electrode 14 may also have a solid structure in which the subpixel electrodes 14S have no trunk portions or branch portions as shown in FIG. 2B(a). In that case, the liquid crystal molecules in each pixel will be aligned radially around an alignment control structure 24f (which is typically a rivet made of a photosensitive resin or a no electrode (hole) region) arranged on each sub-counter electrode 14S so as to face the center of its associated subpixel electrode 14S as shown in 2B(b). In other words, in that case, there will be an infinitely divided structure around the alignment control structure 24f, i.e., an infinite number of domains in which the directors point mutually different alignment azimuths, and the alignment azimuths pointed by those directors will change continuously around the alignment control structure 24f. Such an alignment is sometimes called a "continuous pinwheel alignment". Also, when a voltage is applied to the liquid crystal layer, an oblique electric field will be generated in the vicinity of the gaps 14e between the subpixel electrodes 14S and such an infinitely divided structure will be formed around the alignment control structure 24f under the influence of that electric field.

Now take a look at FIG. 1(a) again.

Hereinafter, it will be described how to fabricate the liquid crystal display panel 100A shown in FIG. 1(a).

A liquid crystal cell with a liquid crystal layer including a liquid crystal material (which may be a negative liquid crystal material produced by Merck & Co., Inc.) and 0.25 wt % of photo-polymerizable monomer (which may be an acrylic monomer produced by Merck & Co., Inc.) is provided between the first and second substrates 10A and 20A. A vertical alignment film (which may be a vertical alignment film produced by JSR Corporation and which corresponds to the alignment films 16a and 26a) is formed on each of the first and second substrates 10A and 20A (which may be a TFT substrate and a color filter substrate, respectively), and a liquid crystal layer is formed so as to contact with each of those vertical alignment films.

Next, with a voltage of 2.5 V (which may be an AC voltage at a frequency of 60 Hz) applied to the sub-counter electrode 24b associated with a region to be the high-pretilt region R2a, a voltage of 20 V (which may be an AC voltage at a frequency of 60 Hz) applied to the sub-counter electrode 24a associated with a region to be the low-pretilt region R1a, a voltage of 10 V (which may be a DC voltage) applied to a terminal corresponding to the gate terminal of a TFT, and a voltage of 0 V applied to a terminal corresponding to the source electrode and a terminal corresponding to the storage capacitor electrode, the entire surface of the liquid crystal cell was irradiated with an ultraviolet ray from over the first substrate 10A under such a condition that the exposure would be 5 J/cm$^2$ at a wavelength of 365 nm.

This is a process that uses the PSA technology (and will be sometimes referred to herein as a "PSA process"). According to the conventional PSA technology, the counter electrode never has a plurality of sub-counter electrodes or the PSA process is never carried out with multiple different voltages applied within a single pixel, and therefore, the liquid crystal molecules 32 will have a uniform pretilt angle within a single pixel after subjected to the PSA process.

On the other hand, according to an embodiment of the present invention, a plurality of sub-counter electrodes 24a, 24b are provided within a single pixel, and the PSA process is carried out with at least two different voltages applied within a single pixel, and therefore, there can be multiple groups of liquid crystal molecules 32 with mutually different pretilt angles within a single pixel. For example, after being subjected to the PSA process, their pretilt angle will be 89.5 degrees in the high-pretilt region R2a and will be 87.0 degrees in the low-pretilt region R1a and the difference in pretilt angle between those regions within a single pixel will be 2.5 degrees.

Now take a look at FIG. 1(b) again.

Hereinafter, it will be described how to fabricate the liquid crystal display panel 100B shown in FIG. 1(b).

A liquid crystal cell with a liquid crystal layer including a liquid crystal material (which may be a negative liquid crystal material produced by Merck & Co., Inc.) is provided between the first and second substrates 10B and 20B. A photosensitive vertical alignment film (which may be a photosensitive vertical alignment film produced by JSR Corporation and which corresponds to the alignment films 16b and 26b) is formed on each of the first and second substrates 10B and 20B (which may be a TFT substrate and a color filter substrate, respectively), and a liquid crystal layer is formed so as to contact with each of those photosensitive vertical alignment films.

Next, with a voltage of 2.5 V (which may be an AC voltage at a frequency of 60 Hz) applied to the sub-counter electrode 24b associated with a region to be the high-pretilt region R2b, a voltage of 20 V (which may be an AC voltage at a frequency of 60 Hz) applied to the sub-counter electrode 24a associated with a region to be the low-pretilt region R1b, a voltage of 10 V (which may be a DC voltage) applied to a terminal corresponding to the gate terminal of a TFT, and a voltage of 0 V applied to a terminal corresponding to the source electrode and a terminal corresponding to the storage capacitor electrode, the entire surface of the liquid crystal cell was irradiated with an ultraviolet ray from over the first substrate 10B under such a condition that the exposure would be 5 J/cm$^2$ at a wavelength of 365 nm.

This is a process of giving a pretilt to liquid crystal molecules using a cross-linking structure, dimer or isomer 35 formed through a photo-reaction of the photosensitive vertical alignment film. According to the conventional technology using a photosensitive vertical alignment film, the counter electrode never has a plurality of sub-counter electrodes or the process of giving a pretilt to liquid crystal molecules is never carried out with multiple different voltages applied within a single pixel, and therefore, the liquid crystal molecules 32 will have a uniform pretilt angle within a single pixel after subjected to that process.

On the other hand, according to an embodiment of the present invention, a plurality of sub-counter electrodes 24a, 24b are provided within a single pixel, and the process of giving a pretilt to liquid crystal molecules is carried out with at least two different voltages applied within a single pixel, and therefore, there can be multiple groups of liquid crystal molecules 32 with mutually different pretilt angles within a single pixel. For example, after being subjected to that process, their pretilt angle will be 89.5 degrees in the high-pretilt region R2b and will be 87.0 degrees in the low-pretilt region R1b and the difference in pretilt angle between those regions within a single pixel will be 2.5 degrees.

Figure 3:
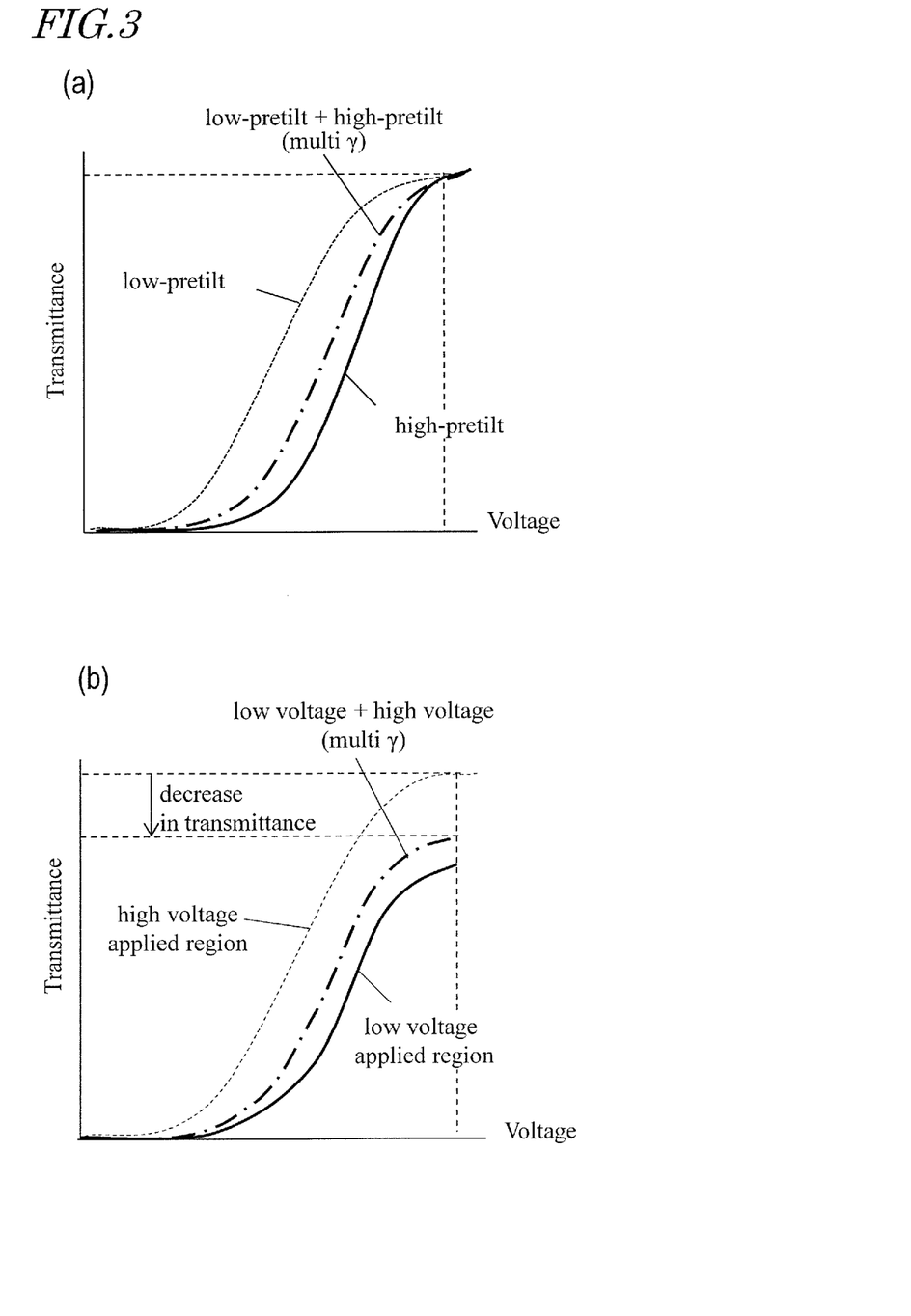

FIG. 3(a) shows the respective (front) V-T (voltage-transmittance) characteristics of a liquid crystal display panel in which "high-pretilt+low-pretilt" regions are defined within a pixel by the method shown in FIGS. 1(b) and 2A and in which pretilt angle $\Theta_1$/pretilt angle $\Theta_2$ is 89.5 degrees/87.0 degrees, a liquid crystal display panel in which a "high-pretilt" region is defined in the entire pixel by applying an AC voltage of 2.5 V (at a frequency of 60 Hz) uniformly to the sub-counter electrodes 24a and 24b and in which the pretilt angle is 89.5 degrees, and a liquid crystal display panel in which a "low-pretilt" region is defined in the entire pixel by applying an AC voltage of 20 V (at a frequency of 60 Hz) uniformly to the sub-counter electrodes 24a and 24b and in which the pretilt angle is 87.0 degrees.

As a comparative example, FIG. 3(b) shows the (front) V-T (voltage-transmittance) characteristic of a liquid crystal display panel in which the pretilt angle of the liquid crystal layer within a pixel is set to be in the vicinity of the average (of 88.7 degrees) in a situation where "high-pretilt+low-pretilt" regions are defined within a pixel by applying an AC voltage of 10 V (at a frequency of 60 Hz) uniformly to the sub-counter electrodes 24a and 24b and in which a single is divided into a high-voltage applied region and low-voltage applied regions by applying mutually different voltages to the sub-counter electrodes 24a and 24b during a display operation. The liquid crystal display panel of the comparative example includes three sub-counter electrodes within a single pixel, and has two low-voltage applied regions corresponding to two high-pretilt regions R2a and one high-voltage applied region corresponding to one low-pretilt region R1a within a single pixel. Also, the voltage applied to the liquid crystal layer in the low-voltage applied regions is set to be approximately 0.7 times as high as the voltage applied to the liquid crystal layer in the high-voltage applied region.

Figure 4:
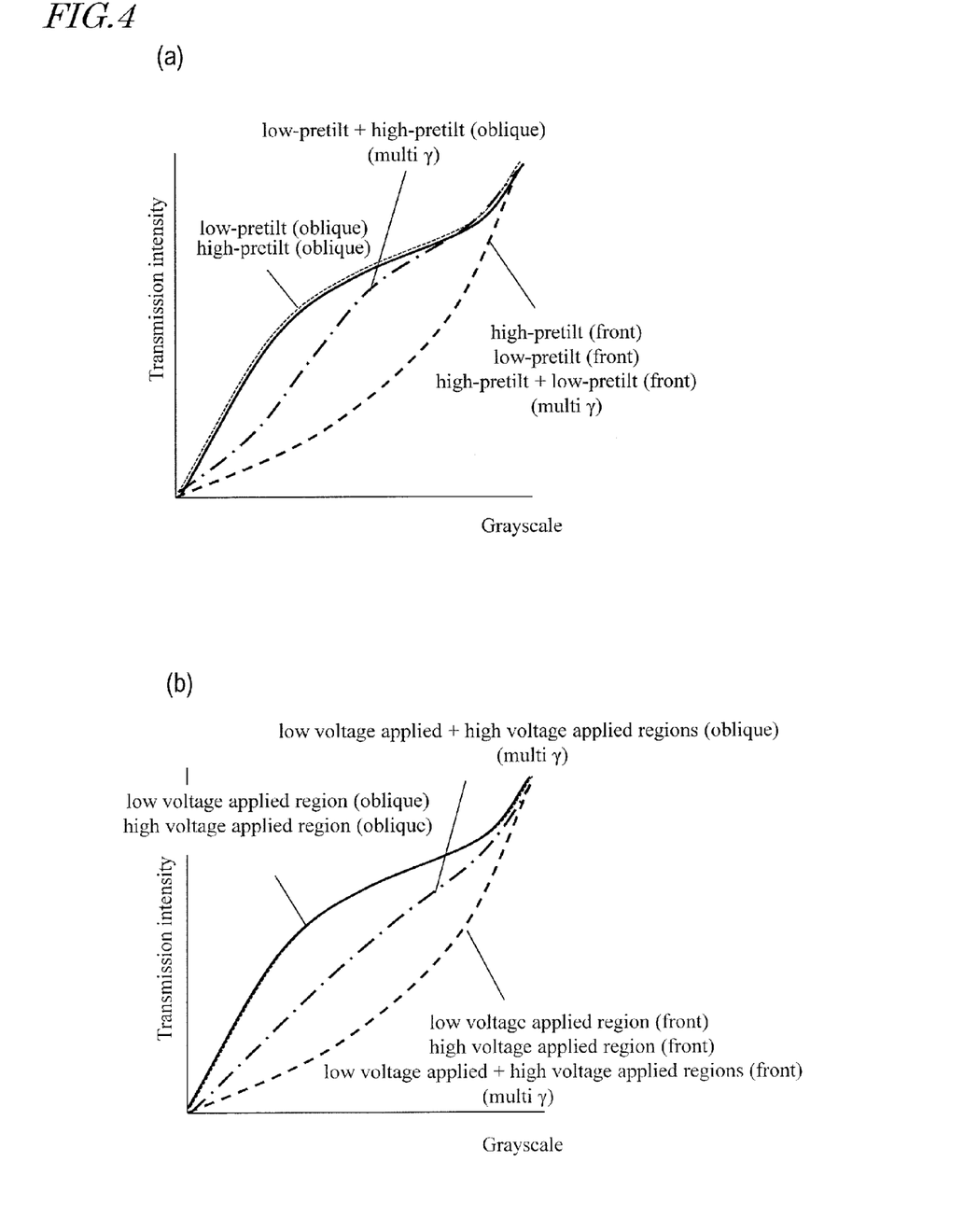

FIG. 4(a) shows the (front and oblique) γ characteristics of a liquid crystal display panel as a specific example of the present invention, and FIG. 4(b) shows the (front and oblique)

γ characteristics of a liquid crystal display panel as a comparative example. It should be noted that the oblique viewing angle is supposed to define a tilt angle of 60 degrees with respect to a normal to the display screen in the azimuth angle 0 degree (three o'clock) direction.

As can be seen from FIG. 3(a), as the pretilt angle is increased, the threshold voltage (i.e., a voltage at which the transmittance starts to rise) shifts and changes into a higher one but the voltage at which the transmittance gets saturated (i.e., the transmittance in white display mode) hardly changes. The same can be said even when there are high- and low-pretilt regions within a single pixel. The liquid crystal display panel exhibits an intermediate V-T characteristic according to their area ratio. In that case, the threshold value just shifts into a higher one but the voltage at which the transmittance gets saturated (i.e., the transmittance in white display mode) hardly changes.

Meanwhile, as can be seen from FIG. 3(b), if the voltage applied to the low-voltage applied regions is always set to be 0.7 times as high as the one applied to the high-voltage applied region, then not only the threshold voltage but also the voltage at which the transmittance gets saturated shift and change into higher ones in the low-voltage applied regions. As a result, the transmittance in the white display mode will decrease unless the drive voltage is raised. The same can be said even when there are low- and high-voltage applied regions within a single pixel. The liquid crystal display panel of the comparative example exhibits an intermediate V-T characteristic according to their area ratio. However, not just the threshold value but also the voltage at which the transmittance gets saturated shift into higher ones as well, and therefore, the transmittance in the white display mode decreases.

Unlike the liquid crystal display device disclosed in Patent Document No. 6, the liquid crystal display panels 100A and 100B can exhibit the characteristics shown in FIG. 3(a) even without applying mutually different voltages to the respective sub-counter electrodes 24a and 24b, and therefore, can achieve high transmittance without adopting a complicated display driving method.

As can be seen from FIG. 4(a), as far as the γ characteristics are concerned, the variation in γ characteristic at an oblique viewing angle (i.e., a shift into a higher transmission intensity from the front r characteristic at γ=2.2, for example, which will be sometimes referred to herein as a "γ shift") in a low-grayscale range, in particular, is smaller in a liquid crystal display panel in which a single pixel is divided into a high-pretilt region and a low-pretilt region than in a liquid crystal display panel in which the entire pixel is either a high-pretilt region or a low-pretilt region. The reason is that by defining multiple regions with different pretilt angles within a single pixel, multiple regions with different V-T characteristics are created within the pixel and the γ shift at an oblique viewing angle can be suppressed. In the low-pretilt region, the V-T characteristic shifts toward a low-voltage range, and therefore, the variation in transmission intensity (i.e., the γ shift) at an oblique viewing angle increases in a low-grayscale range. On the other hand, in the high-pretilt region, the V-T characteristic shifts toward a high-voltage range, and therefore, the variation in transmission intensity (i.e., the γ shift) at an oblique viewing angle decreases in a low-grayscale range. The transmission intensity of the entire pixel is obtained by adding together the low-pretilt region's transmission intensity multiplied by its area ratio with respect to the entire pixel and the high-pretilt region's transmission intensity multiplied by its area ratio with respect to the entire pixel. However, since the high-pretilt region accounts for the larger percentage of the pixel's area, the variation in transmission intensity (i.e., the γ shift) at an oblique viewing angle in the entire pixel becomes a relatively small one.

In the liquid crystal display panel in which the entire pixel is defined to be either a high-pretilt region or a low-pretilt region, there is a significant variation in transmission intensity (i.e., the γ shift) at an oblique viewing angle, and the degree of the γ shift hardly changes according to the pretilt angle. The reason is that the γ characteristic is not set by the voltage but by the grayscale based on the transmission intensity (relative intensity). That is to say, even if the V-T characteristic is shifted by changing the pretilt angle of the entire pixel, the grayscale is set based on the transmission intensity (that is a relative intensity). That is why even if the voltage value associated with each grayscale changes, the γ characteristic hardly changes, and therefore, the γ shift hardly changes, either.

On the other hand, as can be seen from FIG. 4(b), the liquid crystal display panel of the comparative example has a γ characteristic in which the transmission intensity at an oblique viewing angle varies less in the entire grayscale range. Nevertheless, it should be remembered that the liquid crystal display panel of the comparative example reduces the γ shift in the entire grayscale range by sacrificing (i.e., decreasing) the transmittance in the white display mode. The decrease in transmittance can be compensated for if the luminance of the backlight can be increased accordingly. In that case, however, the power dissipation will increase so much that such a liquid crystal display panel cannot be used effectively in a mobile electronic device that is supposed to be driven by battery.

The liquid crystal display panel of the specific example of the present invention can reduce the γ shift in the low-grayscale range, in particular. If the γ shift increased in the low-grayscale range (i.e., if the transmission intensity increased at an oblique viewing angle), then the display quality would be affected more significantly than in a situation where the γ shift increases in the high-grayscale range. In a mode with a high contrast ratio such as a VA (vertical alignment) mode, in particular, if the shift in the low-grayscale range were significant, then a whitening phenomenon would be produced and the display panel would give an impression as if the panel had a low contrast ratio, and would have a decreased product value. In the liquid crystal display panels 100A and 100B according to an embodiment of the present invention, the γ shift in the low-grayscale range is reduced to achieve significant improvement effects and to check a decrease in transmittance.

In the liquid crystal display device 100A described above, the pretilt angle of the high-pretilt region R2a is set to be 89.5 degrees and the pretilt angle of the low-pretilt region R1a is set to be 87.0 degrees. However, if the voltage applied to the sub-counter electrodes during the PSA process and the exposure of an ultraviolet ray are changed, the pretilt angles of the respective regions can be changed. The following Table 1 shows a relation between the PSA process condition and the pretilt angle. In Table 1, the high-pretilt region and the low-pretilt region sometimes have the same pretilt angle. However, this setting was adopted to find the relation between the pretilt angle and the luminance in the black display mode (black luminance) or the relative contrast ratio, and a common voltage was applied to the sub-counter electrodes of the respective regions.

TABLE 1

| AC voltage (V) | | | Pretilt angle (degrees) | | |
|---|---|---|---|---|---|
| High-pretilt region | Low-pretilt region | UV ray exposure [J/cm²] | High-pretilt region | Low-pretilt region | Tilt difference (degrees) |
| 0 | 0 | 5 | 90.0 | 90.0 | 0.0 |
| 2.5 | 2.5 | 5 | 89.5 | 89.5 | 0.0 |
| 5 | 5 | 5 | 89.0 | 89.0 | 0.0 |
| 10 | 10 | 5 | 88.0 | 88.0 | 0.0 |
| 20 | 20 | 5 | 87.0 | 87.0 | 0.0 |
| 20 | 20 | 10 | 84.0 | 84.0 | 0.0 |
| 0 | 20 | 5 | 90.0 | 87.0 | 3.0 |
| 3 | 20 | 5 | 89.5 | 87.0 | 2.5 |
| 5 | 20 | 5 | 89.0 | 87.0 | 2.0 |
| 10 | 20 | 5 | 88.0 | 87.0 | 1.0 |
| 5 | 20 | 10 | 88.0 | 84.0 | 4.0 |

The pretilt angle tends to increase roughly proportionally to the (AC) voltage applied to the liquid crystal layer and the exposure of the ultraviolet ray (UV ray exposure). If the entire surface is exposed, the pretilt angle can be controlled by setting the voltages applied to the respective regions to be arbitrary ones.

Also, even if a photosensitive group is included in the alignment film and if pretilt is given by applying a voltage to the liquid crystal layer and exposing it to an ultraviolet ray after the liquid crystal material has been injected as in the liquid crystal display panel 100B, the pretilt angle also tends to increase proportionally to the voltage applied to the liquid crystal layer and the exposure of the ultraviolet ray. That is why if the entire surface is exposed, the pretilt angle can be controlled by setting the voltages applied to the respective regions to be arbitrary ones.

Figure 5:
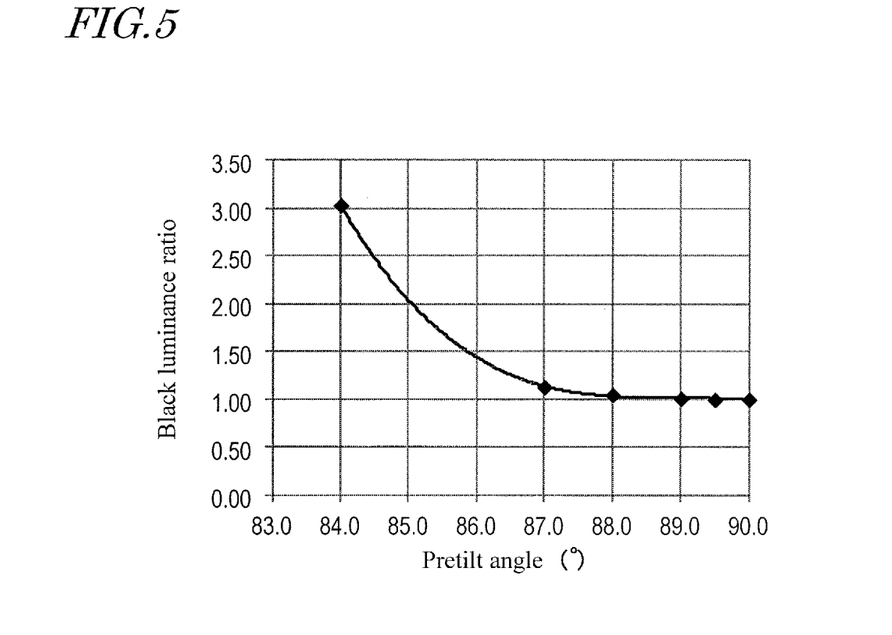
FIG. 5 A graph showing a relation between the pretilt angle and the black luminance ratio.
Figure 6:
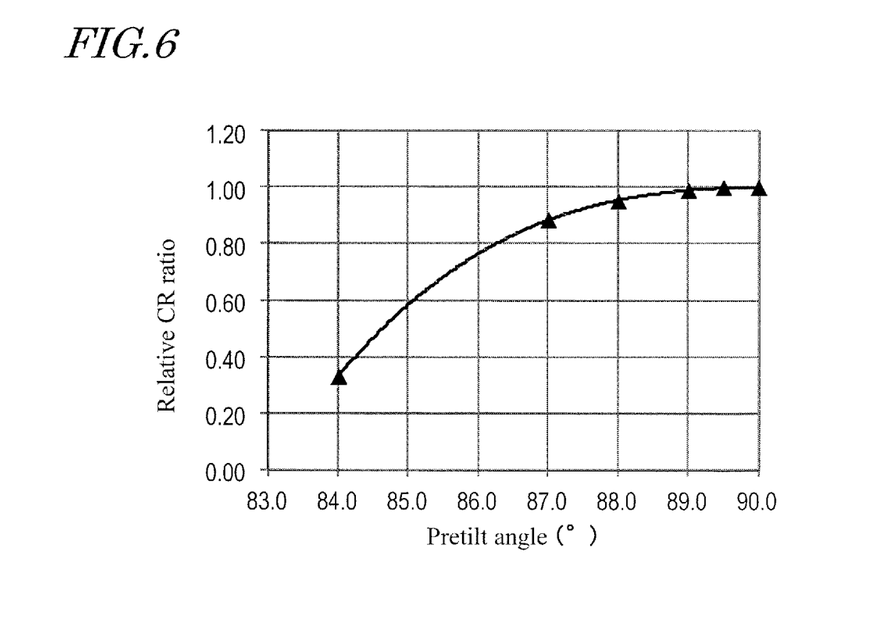
FIG. 6 A graph showing a relation between the pretilt angle and the relative contrast ratio.

FIG. 5 shows the relation between the pretilt angle and the black luminance ratio (when the black luminance at a pretilt angle of 90.0 degrees is supposed to be one) obtained in Table 1, and FIG. 6 shows the relation between the pretilt angle and the relative contrast ratio. The respective values shown in FIGS. 5 and 6 were obtained by evaluating samples with the same pretilt angle within a single pixel. For example, if a low-pretilt region R1a and a high-pretilt region R2a are present within a single pixel, have pretilt angles of 89.5 degrees and 87.0 degrees, respectively, and have a ratio of one to two as in the liquid crystal display panel 100A, the average pretilt angle in the entire pixel becomes 88.7 degrees (=(89.5 degrees×2+87.0 degrees)/3).

As can be seen from FIGS. 5 and 6, if the pretilt angle is equal to or greater than 87.0 degrees, the increase in black luminance ratio and the decrease in relative contrast ratio can be limited to relatively small ones. However, if the pretilt angle is equal to or smaller than 86.0 degrees, the black luminance ratio and the relative contrast ratio start to steeply rise and fall, respectively.

The following Table 2 shows the relation between the pretilt angle and the optical property values. The data shown in the following Table 2 includes the results of measurement obtained from a liquid crystal display panel in which a low-pretilt region R1a and a high-pretilt region R2a are present within a single pixel as in the liquid crystal display panel 100A:

TABLE 2

| Pretilt angle (degrees) | | | | Optical properties | |
|---|---|---|---|---|---|
| High-pretilt region | Low-pretilt region | Average in entire pixel | Tilt difference (degrees) | Black luminance ratio | Relative CR ratio |
| 90.0 | 90.0 | 90.0 | 0.0 | 1.00 | 1.00 |
| 89.5 | 89.5 | 89.5 | 0.0 | 1.00 | 1.00 |
| 89.0 | 89.0 | 89.0 | 0.0 | 1.01 | 0.99 |
| 88.0 | 88.0 | 88.0 | 0.0 | 1.05 | 0.95 |
| 87.0 | 87.0 | 87.0 | 0.0 | 1.13 | 0.88 |
| 84.0 | 84.0 | 84.0 | 0.0 | 3.03 | 0.33 |
| 90.0 | 87.0 | 89.0 | 3.0 | 1.04 | 0.96 |
| 89.5 | 87.0 | 88.7 | 2.5 | 1.04 | 0.96 |
| 89.0 | 87.0 | 88.3 | 2.0 | 1.05 | 0.95 |
| 88.0 | 87.0 | 87.7 | 1.0 | 1.08 | 0.93 |
| 88.0 | 84.0 | 86.7 | 4.0 | 1.23 | 0.81 |

As can be seen from Table 2, if the average pretilt angle within a single pixel is equal to or greater than 87.0 degrees, the increase in black luminance ratio and the decrease in relative contrast ratio can be limited to 20% or less. It can also be seen that if the average pretilt angle within a single pixel is equal to or smaller than 86.0 degrees, the black luminance ratio and the relative contrast ratio start to steeply rise and fall, respectively.

That is to say, to check the decrease in relative contrast ratio, the average pretilt angle within a single pixel is suitably set to be equal to or greater than 87.0 degrees. If the high-pretilt region R2a and the low-pretilt region R1a have a ratio of two to one, the high-pretilt region R2a suitably has a pretilt angle of 88.0 degrees to less than 90.0 degrees and the low-pretilt region R1a suitably has a pretilt angle of 84.0 degrees to less than 88.0 degrees. In this case, the pretilt angle of the high-pretilt region R2a is supposed to be less than 90.0 degrees, because if the high-pretilt region R2a had a pretilt angle of 90.0 degrees or more, the liquid crystal molecules 32 would have their alignment azimuth unfixed (i.e., their alignment would lose stability) and sometimes would cause some roughness and a significant delay in response.

Figure 7:
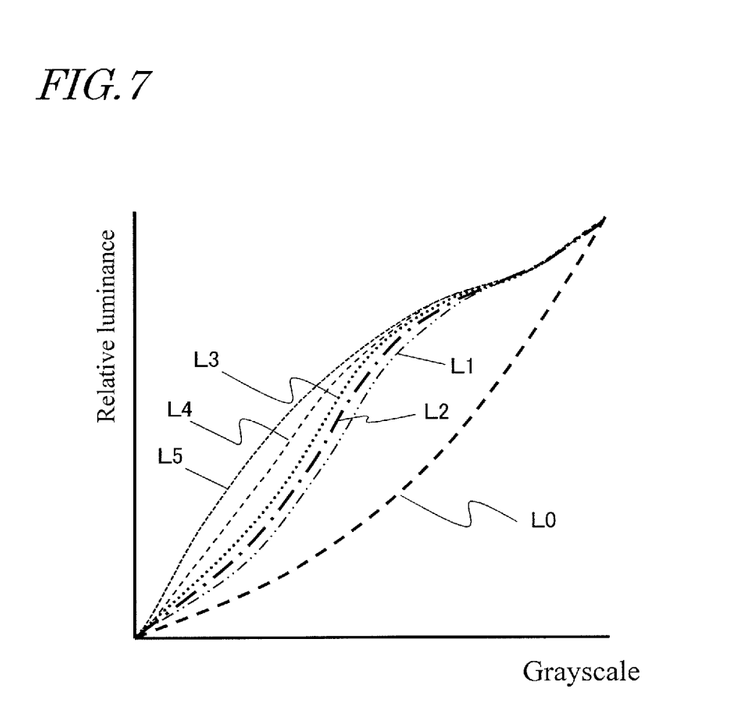
FIG. 7 A graph showing the γ characteristics L1 to L5 of various liquid crystal display panels at an oblique viewing angle along with a γ characteristic L0 at a front viewing angle for reference.

Next, the effect of improving the γ characteristic will be described with reference to FIG. 7, which is a graph showing the γ characteristics L1 to L5 of various liquid crystal display panels at an oblique viewing angle. In FIG. 7, a γ characteristic L0 at a front viewing angle is also shown for your reference. In this case, the "oblique viewing angle" is a direction which defines a tilt angle of 60 degrees with respect to a normal to the display screen in the azimuth angle 0 degree direction. It should be noted that the curve L0 showing the γ characteristic at the front viewing angle is a curve which satisfies γ=2.2. The curves L1 to L4 represent the γ characteristics of liquid crystal display panels with the same structure as the liquid crystal display panel 100A which has multiple regions with different pretilt angles within a single pixel. And the curve L5 represents the γ characteristic of a liquid crystal display panel in which the pretilt angle is uniform within a single pixel (i.e., which has no pretilt angle difference).

L1: $\Theta_1=87.0°$, $\Theta_2=90.0°$, $\Theta_2-\Theta_1=3.0$
L2: $\Theta_1=87.0°$, $\Theta_2=89.5°$, $\Theta_2-\Theta_1=2.5$
L3: $\Theta_1=87.0°$, $\Theta_2=89.0°$, $\Theta_2-\Theta_1=2.0$
L4: $\Theta_1=88.0°$, $\Theta_2=89.0°$, $\Theta_2-\Theta_1=1.0$
L5: $\Theta_1=88.0°$, $\Theta_2=88.0°$, $\Theta_2-\Theta_1=0.0$ As can be seen from FIG. 7, even if the absolute values of the pretilt angles $\Theta_1$ and $\Theta_2$ of the low- and high-pretilt regions R1a and R2a are changed but as long as the difference between the pretilt angles $\Theta_1$ and $\Theta_2$ falls within the range of 1.0 degree to 3.0 degrees, the degree of the γ shift is small.

As also can be seen from FIG. 7, the greater the pretilt angle difference, the smaller the degree of the γ shift, and the effect can be achieved particularly significantly in a low-grayscale range. However, if the pretilt angle difference were too big, then the contrast ratio would decrease. That is why the pretilt angle difference is suitably equal to or smaller than 3.0 degrees. Also, if the pretilt angle difference were too small, the contrast ratio could be increased but the γ shift would be improved to a lesser degree. For that reason, the pretilt angle difference is suitably equal to or greater than 1.0 degree. Specifically, if the pretilt angle difference is equal to or smaller than 3.0 degrees, the decrease in contrast ratio can be limited to 20% or less. And if the pretilt angle difference is equal to or greater than 1.0 degree, the γ shift can be improved to a visually sensible degree.

As can be seen from the foregoing description, the liquid crystal display panels 100A and 100B according to an embodiment of the present invention are applicable broadly to any vertical alignment liquid crystal display device operating in the normally black mode.

INDUSTRIAL APPLICABILITY

Embodiments of the present invention are broadly applicable to a liquid crystal display panel and method for fabricating the panel, and are applicable particularly effectively to a vertical alignment liquid crystal display device operating in the normally black mode.

REFERENCE SIGNS LIST

10A, 10B first substrate (TFT substrate)
12, 22 substrate
14 pixel electrode
20A, 20B second substrate (color filter substrate)
30A, 30B liquid crystal layer
32 liquid crystal molecules
35 cross-linking structure, dimer or isomer
16a, 16b first alignment film
17a first alignment sustaining layer
16b1, 26b1, 17a1, 27a1 low-pretilt alignment region
16b2, 26b2, 17a2, 27a2 high-pretilt alignment region
24a, 24b sub-counter electrode
26a, 26b second alignment film
27a second alignment sustaining layer
100A, 100B liquid crystal display panel
R1a, R1b low-pretilt region
R2a, R2b high-pretilt region

The invention claimed is:

1. A liquid crystal display panel comprising:
a liquid crystal layer including liquid crystal molecules;
first and second substrates which are arranged to face each other with the liquid crystal layer interposed between the first and second substrates;
a counter electrode formed on one of the first and second substrates;
a pixel electrode formed on another one of the first and second substrates, the pixel electrode including a plurality of subpixel electrodes which are electrically connected to each other;
a first alignment film formed on one side of the first substrate so as to face the liquid crystal layer;
a second alignment film formed on one side of the second substrate so as to face the liquid crystal layer; and
a pixel, wherein in the pixel, the liquid crystal layer has a low-pretilt region and a high-pretilt region in which the liquid crystal molecules have mutually different pretilt angles,
the plurality of subpixel electrodes include a first subpixel electrode corresponding to the low-pretilt region, and a second subpixel electrode corresponding to the high-pretilt region,
a subpixel gap is defined between the first subpixel electrode and the second subpixel electrode, and the subpixel gap is overlapped by a non-transparent metal layer,
the counter electrode includes a plurality of sub-counter electrodes which are electrically independent of each other,
the plurality of sub-counter electrodes include a first sub-counter electrode corresponding to the low-pretilt region, and a second sub-counter electrode corresponding to the high-pretilt region, and
a sub-counter gap is defined between the first sub-counter electrode and the second sub-counter electrode, and the sub-counter gap is overlapped by the non-transparent metal layer.

2. The liquid crystal display panel of claim 1, wherein the first alignment film has a first low-pretilt alignment region which contacts with the low-pretilt region and a first high-pretilt alignment region which contacts with the high-pretilt region, and
the second alignment film has a second low-pretilt alignment region which contacts with the low-pretilt region and a second high-pretilt alignment region which contacts with the high-pretilt region.

3. The liquid crystal display panel of claim 2, wherein the first and second low-pretilt alignment regions give a pretilt angle of 84.0 degrees to less than 88.0 degrees to the liquid crystal molecules in the low-pretilt region, and
the first and second high-pretilt alignment regions give a pretilt angle of 88.0 degrees to less than 90.0 degrees to the liquid crystal molecules in the high-pretilt region.

4. The liquid crystal display panel of claim 1, further comprising:
a first alignment sustaining layer arranged closer to the liquid crystal layer than the first alignment film is; and
a second alignment sustaining layer arranged closer to the liquid crystal layer than the second alignment film is,
wherein each of the first and second alignment sustaining layers is made of a photo-polymerized compound,
the first alignment sustaining layer has a first low-pretilt alignment region which contacts with the low-pretilt region and a first high-pretilt alignment region which contacts with the high-pretilt region,
the second alignment sustaining layer has a second low-pretilt alignment region which contacts with the low-pretilt region and a second high-pretilt alignment region which contacts with the high-pretilt region, and
the liquid crystal molecules have their pretilt angle defined by the first and second alignment sustaining layers.

5. The liquid crystal display panel of claim 1, wherein at least one of the first and second alignment films has a cross-linking structure, dimer or isomer formed through a photo-reaction.

6. The liquid crystal display panel of claim 1, wherein the pretilt angle of the low-pretilt region is smaller than the pretilt angle of the high-pretilt region by 1.0 to 3.0 degrees.

7. The liquid crystal display panel of claim 1, wherein in the pixel, the area of the high-pretilt region is larger than the area of the low-pretilt region.

8. The liquid crystal display panel of claim 7, wherein in the pixel, the area of the high-pretilt region is approximately twice as large as the area of the low-pretilt region.

9. The liquid crystal display panel of claim 1, wherein the non-transparent metal layer includes at least one of a gate bus line, a source bus line, and a storage capacitor line.

* * * * *